(12) United States Patent
McNamara et al.

(10) Patent No.: US 11,363,760 B2
(45) Date of Patent: Jun. 21, 2022

(54) WREATH DECORATION MOUNTING SYSTEM

(71) Applicants: Richard J. McNamara, Tampa, FL (US); Judith M. Smith, High Ridge, MO (US)

(72) Inventors: Richard J. McNamara, Tampa, FL (US); Judith M. Smith, High Ridge, MO (US)

(*) Notice: Subject to any disclaimer, the term of this patent is extended or adjusted under 35 U.S.C. 154(b) by 0 days.

(21) Appl. No.: 17/498,670

(22) Filed: Oct. 11, 2021

(65) Prior Publication Data
US 2022/0022380 A1    Jan. 27, 2022

Related U.S. Application Data

(63) Continuation-in-part of application No. 17/148,459, filed on Jan. 13, 2021, now Pat. No. 11,156,345, and a continuation-in-part of application No. 29/721,708, filed on Jan. 22, 2020.

(60) Provisional application No. 62/960,570, filed on Jan. 13, 2020.

(51) Int. Cl.
*A01G 5/04* (2006.01)
*A47G 7/00* (2006.01)

(52) U.S. Cl.
CPC .............. *A01G 5/04* (2013.01); *A47G 7/006* (2013.01)

(58) Field of Classification Search
CPC .................................. A01G 5/04; A47G 7/006
USPC ........................................................ 362/122
See application file for complete search history.

(56) References Cited

U.S. PATENT DOCUMENTS

| | | | |
|---|---|---|---|
| 1,853,305 A | | 4/1932 | Frei |
| 5,109,324 A | * | 4/1992 | Ahroni ............ F21S 4/10 362/249.14 |
| 5,150,964 A | * | 9/1992 | Tsui ................ F21S 4/10 362/653 |
| 5,554,420 A | | 9/1996 | Noble |
| 5,789,043 A | | 8/1998 | Law et al. |
| 5,834,901 A | * | 11/1998 | Shen ............... H05B 39/09 315/185 S |
| 7,494,244 B1 | * | 2/2009 | Van Diep ........ F21V 19/001 439/502 |
| 8,234,804 B1 | | 8/2012 | Rush |

(Continued)

FOREIGN PATENT DOCUMENTS

EP    3251870 B1    7/2019

*Primary Examiner* — Bryon T Gyllstrom (57) ABSTRACT

A wreath decoration mounting system is a system that enables the mounting, positioning, and orienting of different ornaments around a wreath's center. The system can be attached at various locations and angles along the wreath's wire frame to support the different ornaments that would otherwise be glued or wired to the wreath's wire frame. The system may include a first wire fastener, a second wire fastener, a support beam, and a support platform. The first wire fastener and the second wire fastener secure the support beam to the wreath's wire frame. The first wire fastener and the second wire fastener also help offset the support beam from the wire frame to hide the support beam behind the wreath. The support beam receives the load from the support platform and any ornament mounted onto the support platform. The support platform facilitates the mounting of the desired ornaments to the support beam.

20 Claims, 12 Drawing Sheets

(56) References Cited

U.S. PATENT DOCUMENTS

| | | | |
|---|---|---|---|
| 2003/0071581 A1* | 4/2003 | Panagotacos | G09F 13/22 |
| | | | 315/185 R |
| 2006/0090384 A1 | 6/2006 | Woodruff | |
| 2008/0169910 A1* | 7/2008 | Greene | H02J 50/70 |
| | | | 340/10.34 |
| 2009/0147509 A1* | 6/2009 | Reed | F21V 21/002 |
| | | | 362/418 |
| 2009/0317568 A1 | 12/2009 | Hruska | |
| 2013/0135870 A1* | 5/2013 | Yokosawa | F21S 8/06 |
| | | | 362/253 |
| 2013/0201658 A1* | 8/2013 | Bogart | F21V 15/00 |
| | | | 362/95 |
| 2018/0299084 A1* | 10/2018 | Chien | F21V 13/02 |
| 2019/0057627 A1 | 2/2019 | Mullett | |
| 2020/0032986 A1* | 1/2020 | Zhang | F21V 23/001 |
| 2020/0128758 A1 | 4/2020 | Pestl | |
| 2021/0215328 A1 | 7/2021 | Mcnamara | |

* cited by examiner

WREATH DECORATION MOUNTING SYSTEM

The current application is a continuation-in-part (CIP) application of the U.S. non-provisional application Ser. No. 17/148,459 filed on Jan. 13, 2021. The U.S. non-provisional application Ser. No. 17/148,459 claims a priority to a U.S. provisional application Ser. No. 62/960,570 filed on Jan. 13, 2020.

The current application is also a CIP application of the U.S. design application Ser. No. 29/721,708 filed on Jan. 22, 2020.

FIELD OF THE INVENTION

The present invention generally relates to decoration mounts and wreath accessories. More specifically, the present invention provides a mounting system for wreath ornaments that allow for more creative wreath decoration.

BACKGROUND OF THE INVENTION

Holiday ornaments are an essential part of home decorations for the holidays. Holiday ornaments come in various types, shapes, and sizes. For example, some of the most common holiday ornaments are Christmas ornaments that are attached to Christmas trees, walls, handrails, etc. Often these holiday ornaments are combined with other holiday decorations to enhance the overall ornamental design, such as covering nativity scenes with lights or adding string lights to wreaths. However, many holiday ornaments do not usually provide means to secure them to the other decorations, forcing users to come up with ways to fasten the whole assembly together. Wreaths, especially, can be difficult to decorate using large ornaments due to the limited space available on the wreath. Furthermore, even when successfully fastening the ornaments to the wreath, it can be difficult to properly position the ornaments on the desired location around the center of a wreath.

Therefore, an objective of the present invention is to provide a system for mounting ornaments on a decorative wreath for displaying various ornaments around the wreath's center. The system enables the fastening of the various ornaments to the wreath's frame so that most of the system is hidden by the wreath's branches or other ornaments. Another objective of the present invention is to provide a system that enables the positioning of the ornaments within the wreath's center so that the ornaments are visible in the wreath's center. Further, the system enables the user to orient the ornaments as desired within the wreath's center. Additional features and benefits are further discussed in the sections below.

SUMMARY OF THE INVENTION

The present invention is a wreath decoration mounting system that enables the user to mount various ornaments such as an engraved/etched acrylic plate to enhance the ornamental design of the wreath. The present invention provides a support beam to facilitate the fastening of the ornaments to the wreath's center. The support beam is an adjustable rigid structure that lifts the ornaments just above the branches in the wreath's center, allowing the support beam to be concealed and the ornaments left visible from the front of the wreath. A pair of wire fasteners on both ends of the support beam help the user secure the system and the ornaments to the wreath's wire frame and positions the apparatus forward and centered on the wreath.

The present invention also provides multiple support attachments that enable the user to position and orient the various ornaments in different locations and orientations within the wreath's center. Furthermore, the present invention provides a platform that facilitates the mounting of ornaments of different shapes and sizes to the support beam of the present invention.

DETAILED DESCRIPTION OF THE INVENTION

All illustrations of the drawings are for the purpose of describing selected versions of the present invention and are not intended to limit the scope of the present invention.

Figure 1:
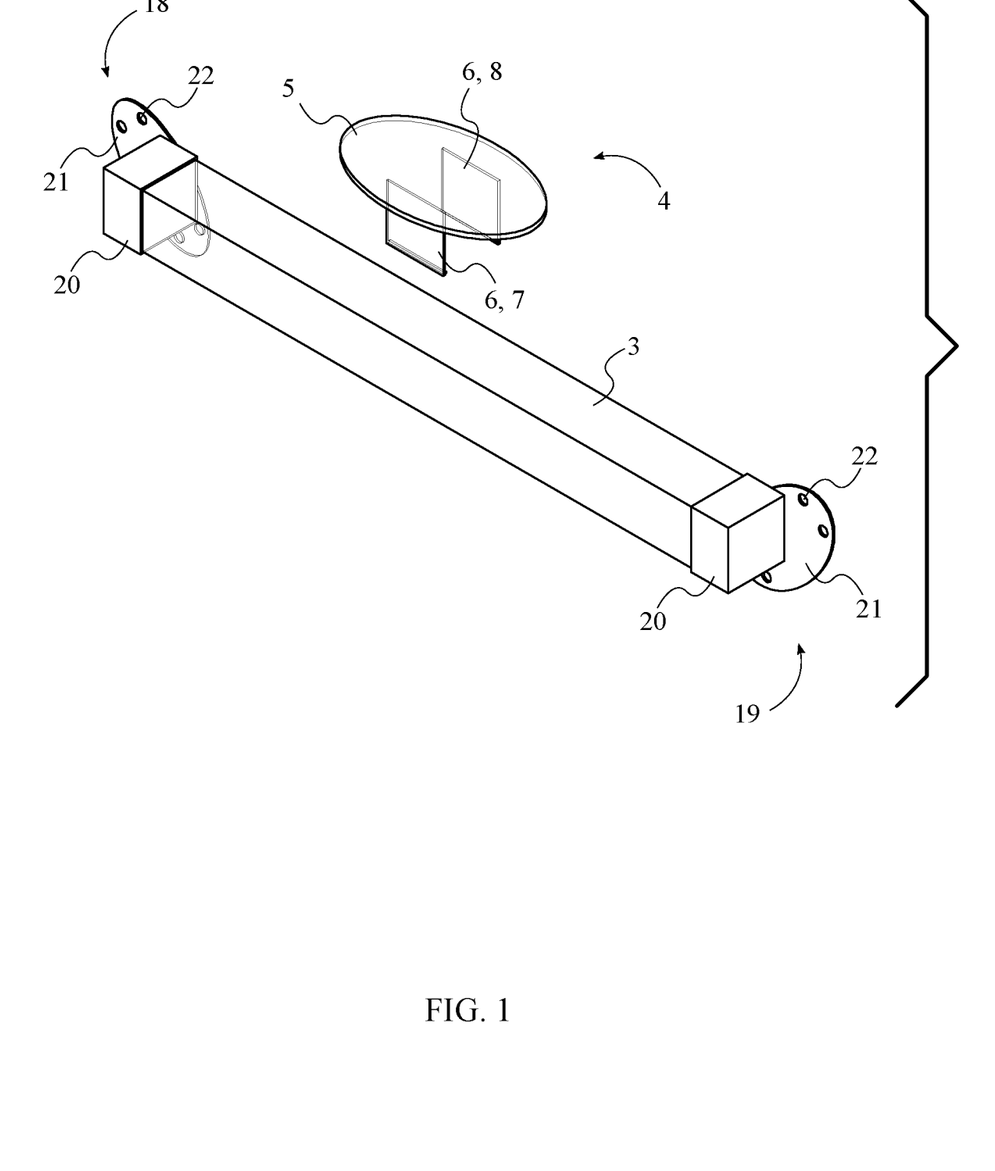
FIG. 1 is an exploded top-front perspective view showing the present invention.
Figure 2:
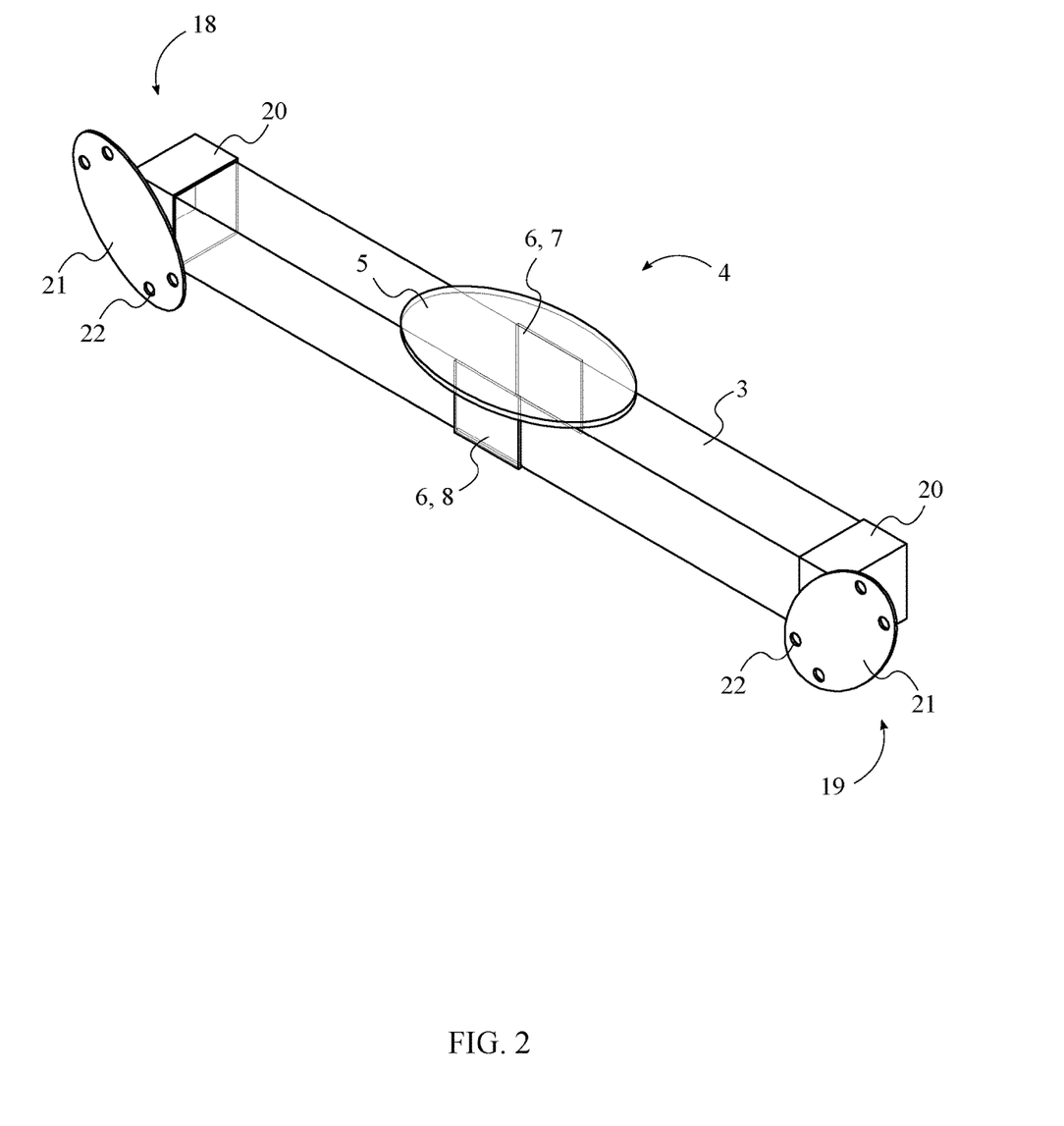
FIG. 2 is a top-rear perspective view showing the present invention.
Figure 3:
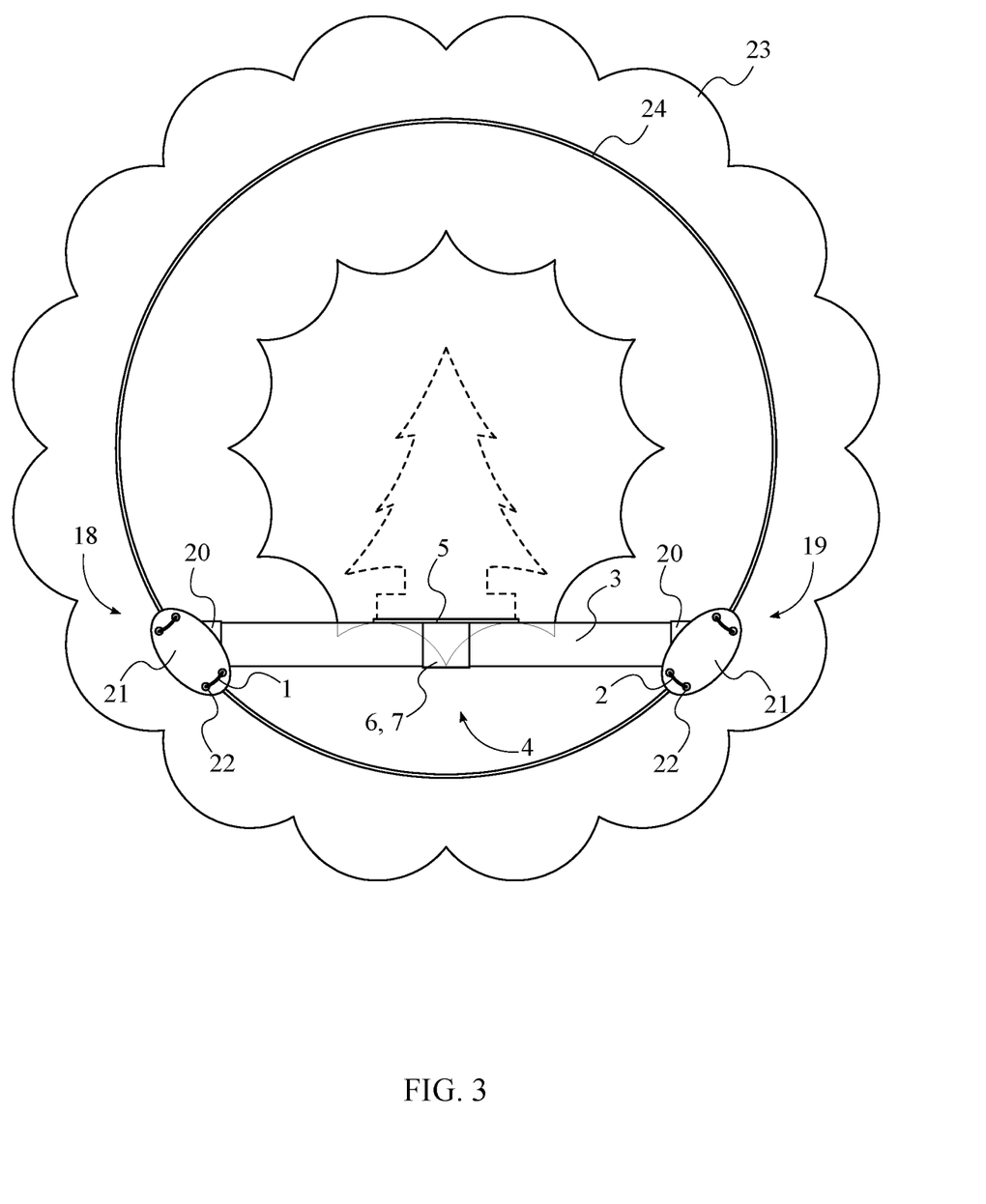
FIG. 3 is a rear view showing the present invention, wherein the present invention is shown mounted to the wire frame of a wreath, and wherein an ornament is shown mounted to the support platform.

The present invention is a wreath decoration mounting system that enables the mounting, positioning, and orienting of different ornaments around a wreath's center. The present invention can be attached at various locations and angles along the wreath's wire frame to support ornaments such as holiday decorations, lights, figurines, toys, stuffed animals, etc., that would otherwise be glued or wired to the wreath's wire frame. As can be seen in FIG. 1 through 3, the present invention may comprise a first wire fastener 1, a second wire fastener 2, a support beam 3, and a support platform 4. The first wire fastener 1 and the second wire fastener 2 help secure the support beam 3 to the wire frame 24 of the wreath 23. The first wire fastener 1 and the second wire fastener 2 also help offset the support beam 3 from the wire frame 24 to hide the support beam 3 behind the wreath 23. The support beam 3 receives the load from the support platform 4 and any ornament mounted onto the support platform 4. The support platform 4 facilitates the mounting of the desired ornaments to the support beam 3.

The general configuration of the aforementioned components allows the user to enhance the holiday decoration of the wreath 23 using different ornaments. As can be seen in FIGS. 3, 6, and 9 through 12, the support platform 4 is designed to accommodate ornaments of different shapes and sizes. For example, the support platform 4 can accommodate a light decoration, a holiday toy, holiday ornaments, etc. To do so, the support platform 4 comprises a platform body 5 and an attachment mechanism 6. The platform body 5 receives the ornament's base to retain the ornament in a desired position and orientation. Accordingly, the platform body 5 may be provided in different sizes to provide a surface large enough to accommodate the desired ornament. The attachment mechanism 6 enables the platform body 5 to be secured to the support beam 3. Moreover, the first wire fastener 1 is terminally mounted to the support beam 3. Similarly, the second wire fastener 2 is terminally mounted to the support beam 3, opposite to the first wire fastener 1. Thus, the support beam 3 can be secured to the wire frame 24 while also being centered on the wreath 23. In other embodiments, the present invention may utilize other fastening means to secure the support beam 3 to the wire frame 24.

Figure 10:
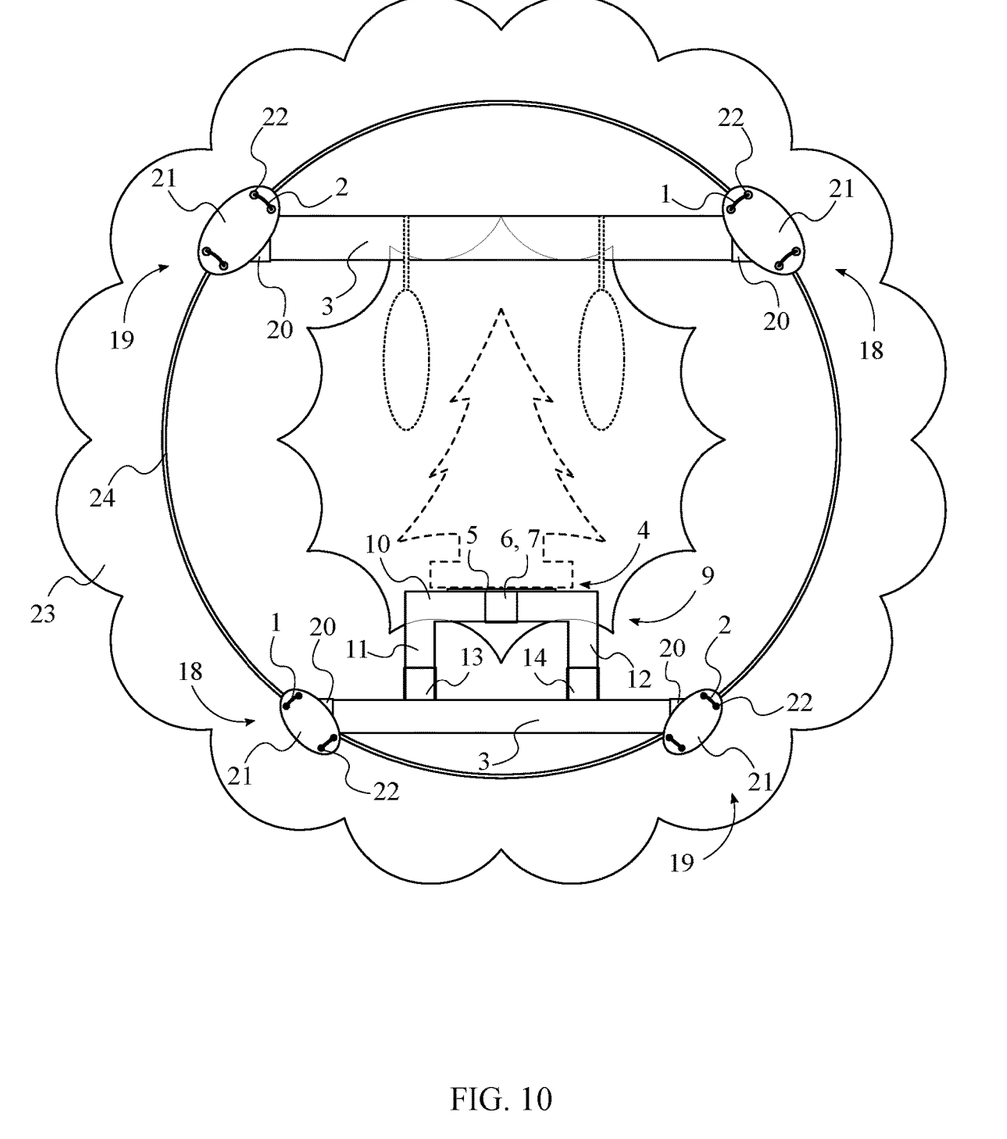
FIG. 10 is a rear view showing the present invention, wherein multiple units of the present invention are shown mounted to the wire frame of the wreath, wherein a first unit is shown supporting an ornament with the U-shaped intermediate support, and wherein a second unit is shown positioned above the first unit supporting hanging ornaments.
Figure 11:
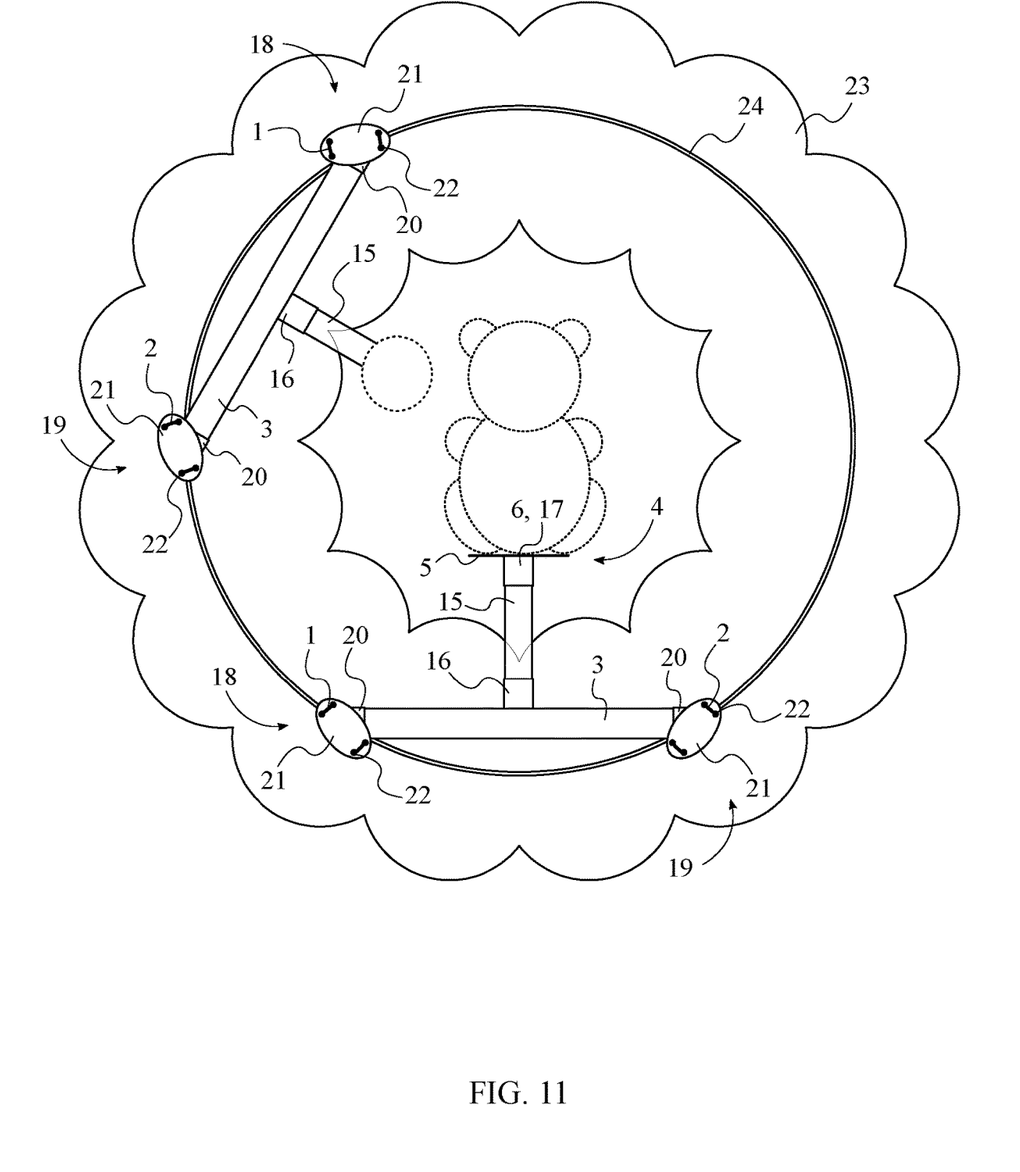
FIG. 11 is a rear view showing the present invention, wherein multiple units of the present invention are shown mounted to the wire frame of the wreath, wherein a first unit is shown supporting an ornament with the pedestal support, and wherein a second unit is shown positioned above the first unit supporting another ornament with another pedestal support.
Figure 12:
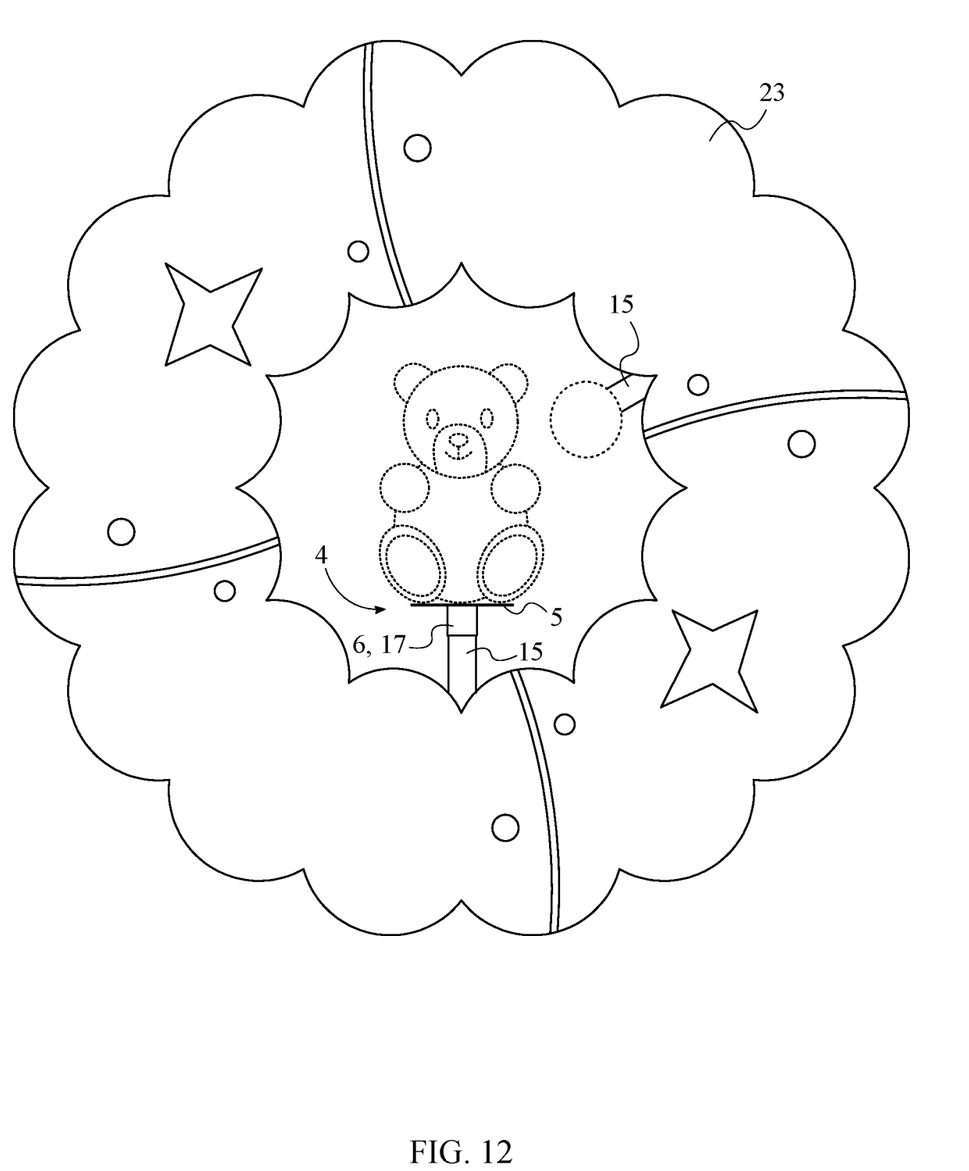
FIG. 12 is a front view showing the present invention, wherein multiple units of the present invention are shown mounted to the wire frame of the wreath, wherein a first unit is shown supporting an ornament with the pedestal support, and wherein a second unit is shown positioned above the first unit supporting another ornament with another pedestal support.

As can be seen in FIG. 10 through 12, the first wire fastener 1 and the second wire fastener 2 also enable the user to position the support beam 3 in different locations around the wire frame 24 while always keeping the support beam 3, the first wire fastener 1, and the second wire fastener 2 hidden from view. For example, the user can hang ornaments from the top of the wreath 23 by fastening the support beam 3 around the top of the wreath 23, or laterally position the support beam 3 on one of the sides of the wreath 23. In addition, the length of the support beam 3 can vary so that multiple ornaments can be mounted onto the support beam 3. Moreover, the attachment mechanism 6 is connected onto the platform body 5 so that the platform body 5 can be secured using the attachment mechanism 6. To secure the support platform 4 to the support beam 3, the platform body 5 is positioned parallel to the support beam 3. Then, the platform body 5 is laterally mounted to the support beam 3 by the attachment mechanism 6. Furthermore, to ensure that the present invention is hidden from view to not ruin the ornamental design of the wreath 23, the support beam 3 and the support platform 4 may be made of a transparent material. In other embodiments, different methods can be used to hide the present invention from view.

As previously discussed, the attachment mechanism 6 enables the quick attachment of the support platform 4 to the support beam 3. To do so, the attachment mechanism 6 may comprise a first flexible jaw 7 and a second flexible jaw 8, as shown in FIG. 1 through 3. The first flexible jaw 7 and the second flexible jaw 8 enable the platform body 5 to be easily snapped onto the support beam 3. The first flexible jaw 7 and the second flexible jaw 8 also enable the quick detachment of the platform body 5 from the support beam 3. To enable the secure snapping of the platform body 5 to the support beam 3, the first flexible jaw 7 and the second flexible jaw 8 are mounted onto the platform body 5. The first flexible jaw 7 and the second flexible jaw 8 are also positioned offset from each other to accommodate the body of the support beam 3. Then, to secure the platform body 5 to the support beam 3, the support beam 3 is laterally pressed in between the first flexible jaw 7 and the second flexible jaw 8. This secures the support platform 4 to the support beam 3 as well as any ornament attached to the platform body 5. In other embodiments, the support platform 4 may utilize different attachment means that enable quick attachment and detachment from the support beam 3.

Figure 4:
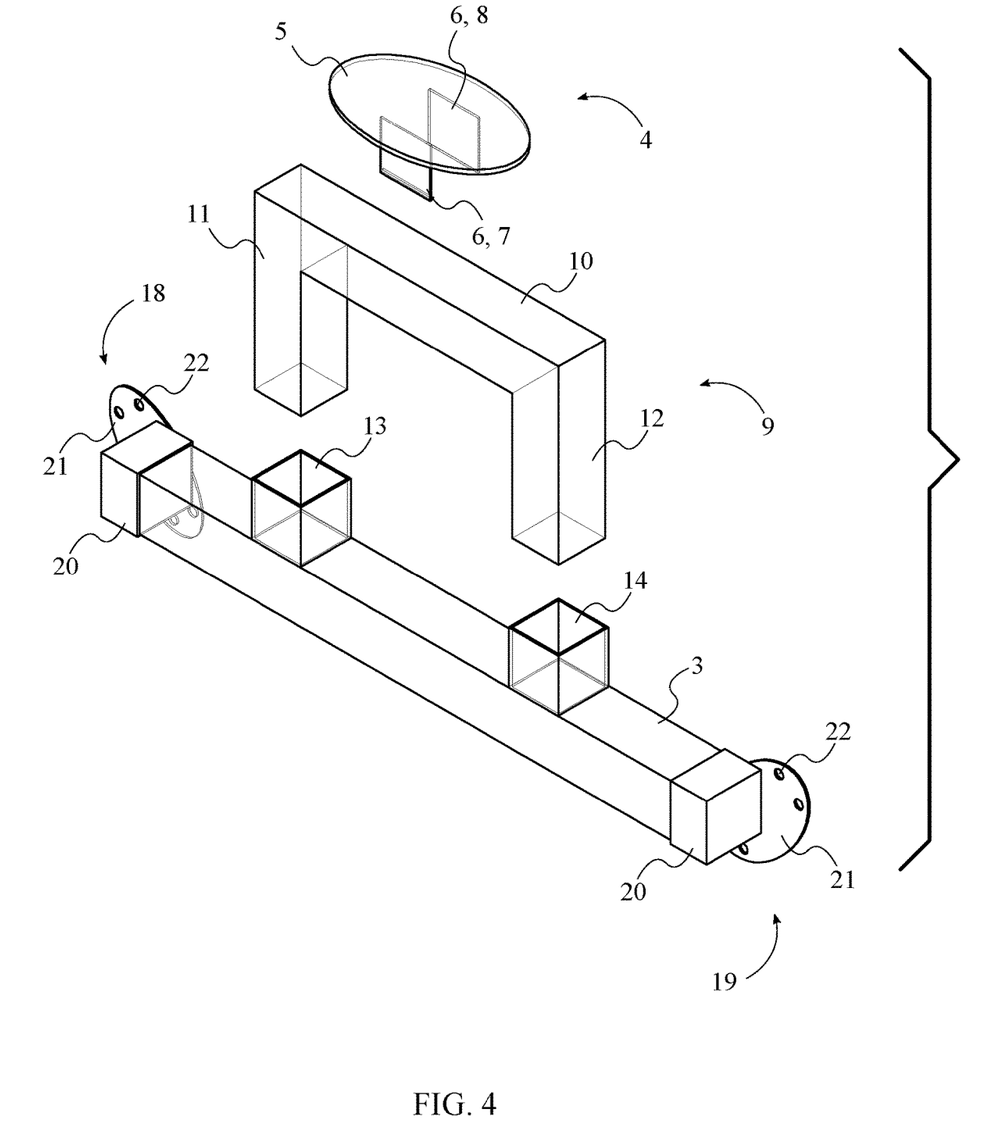
FIG. 4 is an exploded top-front perspective view showing the present invention, wherein the present invention is shown with a U-shaped intermediate support.
Figure 5:
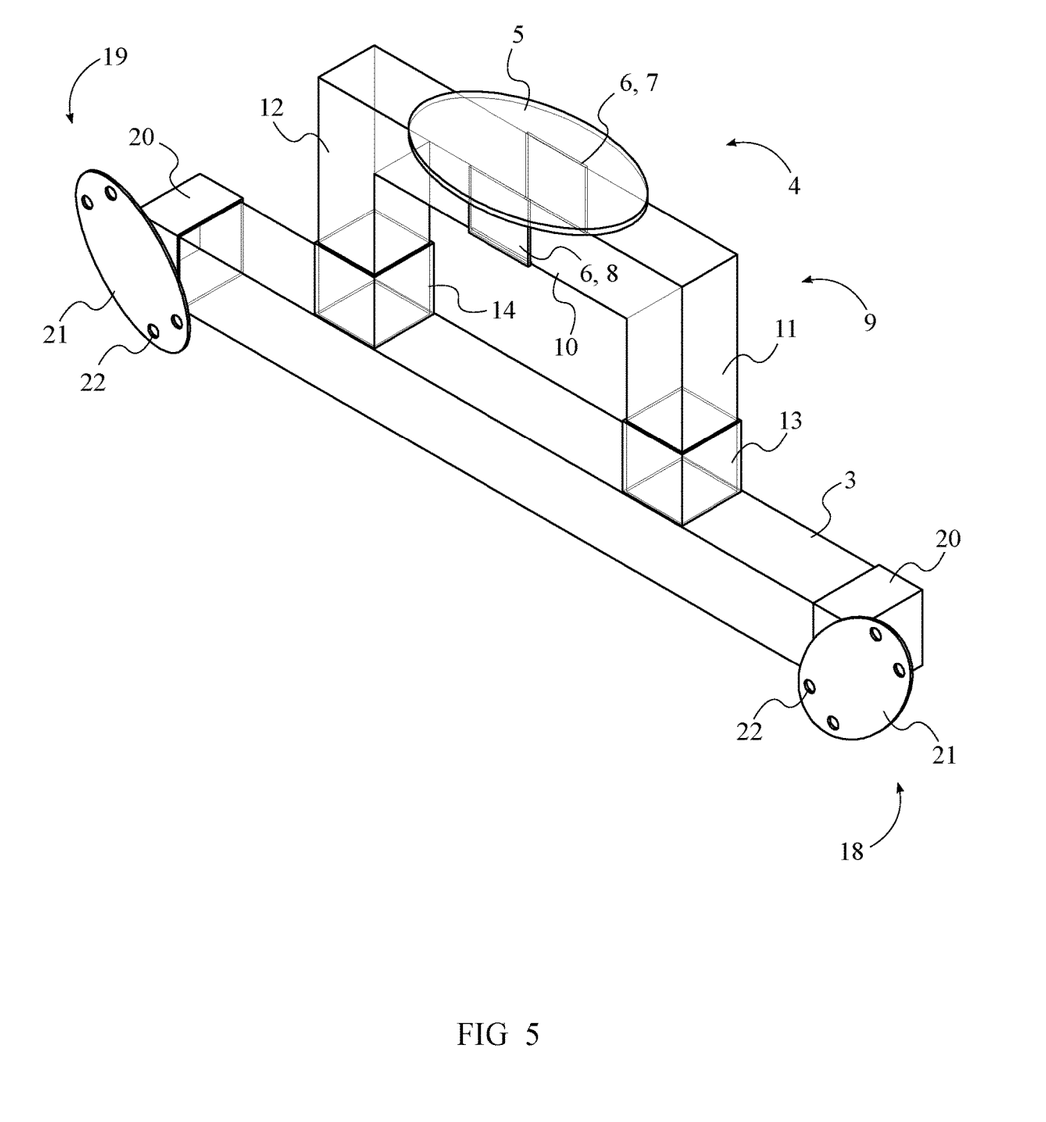
FIG. 5 is a top-rear perspective view showing the present invention, wherein the present invention is shown with the U-shaped intermediate support.
Figure 6:
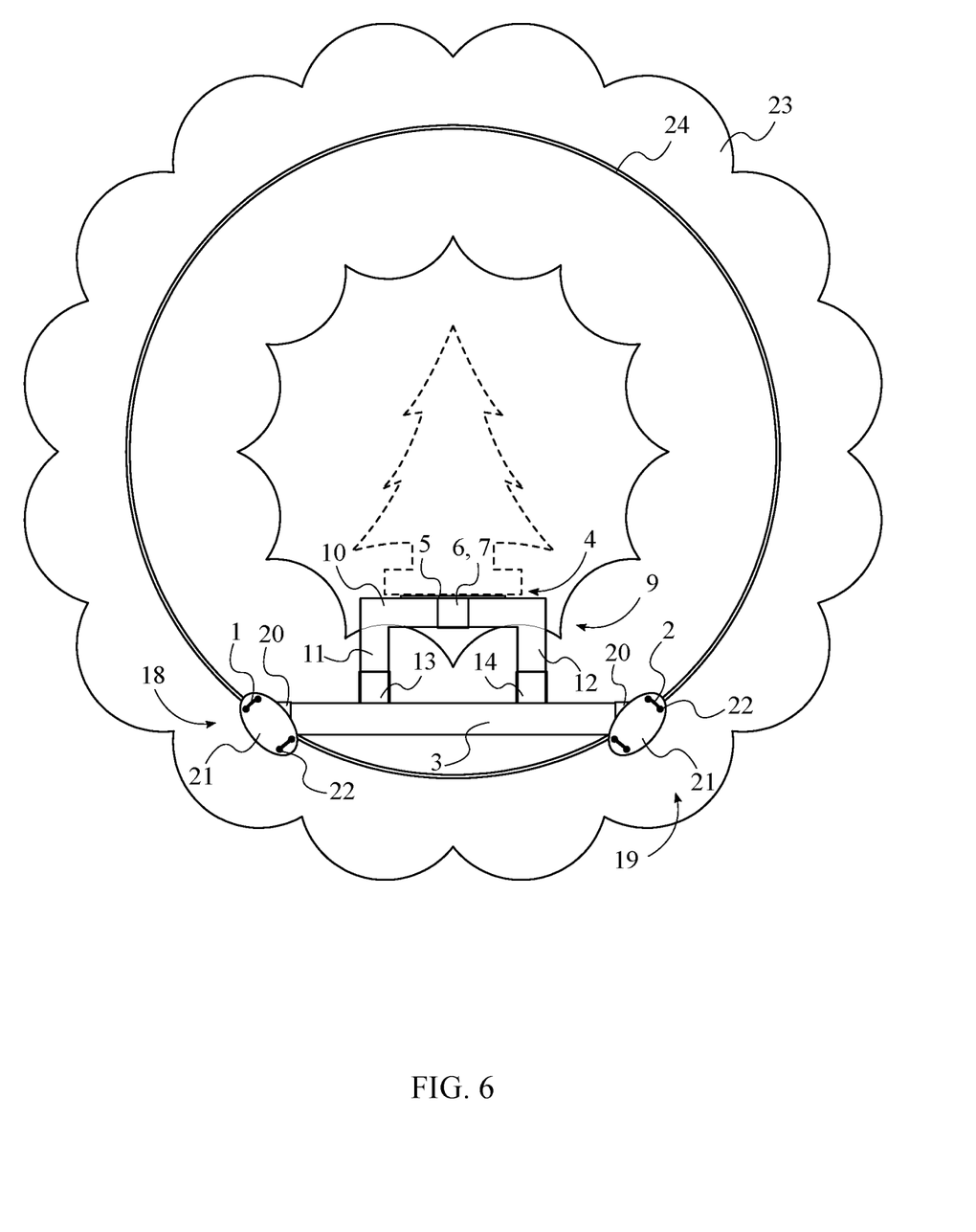
FIG. 6 is a rear view showing the present invention, wherein the present invention is shown mounted to the wire frame of the wreath, and wherein an ornament is shown mounted to the support platform attached to the U-shaped intermediate support.

In some embodiments, the support platform 4 can be offset from the support beam 3 in order to position the desired ornament at a distance from the support beam 3. To do so, the present invention may further comprise a U-shaped intermediate support 9. As can be seen in FIG. 4 through 6, the U-shaped intermediate support 9 offsets the support platform 4 from the support beam 3 while also securing the support platform 4 to the support beam 3. The U-shaped intermediate support 9 can also be made of trimmable material that can be safely trimmed to adjust the overall height of the U-shaped intermediate support 9. Accordingly, the U-shaped intermediate support 9 comprises a support web 10, a first support leg 11, and a second support leg 12. The first support leg 11 and the second support leg 12 enable the support platform 4 to be offset from the support beam 3. Further, the support web 10 enables the attachment of the support platform 4 to the U-shaped intermediate support 9. To form a sturdy support structure, the first support leg 11 and the second support leg 12 are positioned parallel and offset to each other. In addition, to secure the U-shaped intermediate support 9 to the support beam 3, the support beam 3 is terminally attached to the first support leg 11 and the second support leg 12. Moreover, the support web 10 is terminally connected to the first support leg 11 and the second support leg 12, opposite to the support beam 3, to provide an area to receive the support platform 4. This offsets the support web 10 at a distance from the support beam 3 corresponding to the length of the first support leg 11 and the second support leg 12. Finally, the platform body 5 is laterally attached to the support beam 3 by the attachment mechanism 6. This secures the support platform 4 to the rest of the assembly while offsetting the support platform 4 from the support beam 3. Furthermore, the support platform 4 can be easily attached to the U-shaped intermediate support 9. Using the first flexible jaw 7 and the second flexible jaw 8, the platform body 5 can be secured to the support web 10. To do so, the support web 10 is laterally pressed in between the first flexible jaw 7 and the second flexible jaw 8 to secure the platform body 5 to the U-shaped intermediate support 9.

Similar to the support platform 4, the U-shaped intermediate support 9 can be easily attached to the support beam 3 for quick installation. To do so, the present invention may further comprise a first socket 13 and a second socket 14 that enable the quick attachment of the first support leg 11 and the second support leg 12 to the support beam 3. As can be seen in FIG. 4 through 6, the first socket 13 and the second socket 14 are laterally connected to the support beam 3 to receive the first support leg 11 and the second support leg 12, respectively. In addition, to accommodate the size of the U-shaped intermediate support 9, the first socket 13 is positioned offset to the first wire fastener 1. Similarly, the second socket 14 is positioned offset to the second wire fastener 2. Further, the first socket 13 and the second socket 14 are positioned offset from each other at a distance corresponding to the distance between the first support leg 11 and the second support leg 12. Then, to attach the U-shaped intermediate support 9 to the support beam 3, the first support leg 11 is attached into the first socket 13 and the second support leg 12 is attached into the second socket 14. Moreover, to maintain only the ornaments visible on the center of the wreath 23 and hide the rest of the components, the first socket 13 and the second socket 14 may be made of a transparent material. Likewise, the U-shaped intermediate support 9 may be made of a transparent material as well. This enables the first socket 13, the second socket 14, and the U-shaped intermediate support 9 to be hidden from view.

Figure 7:
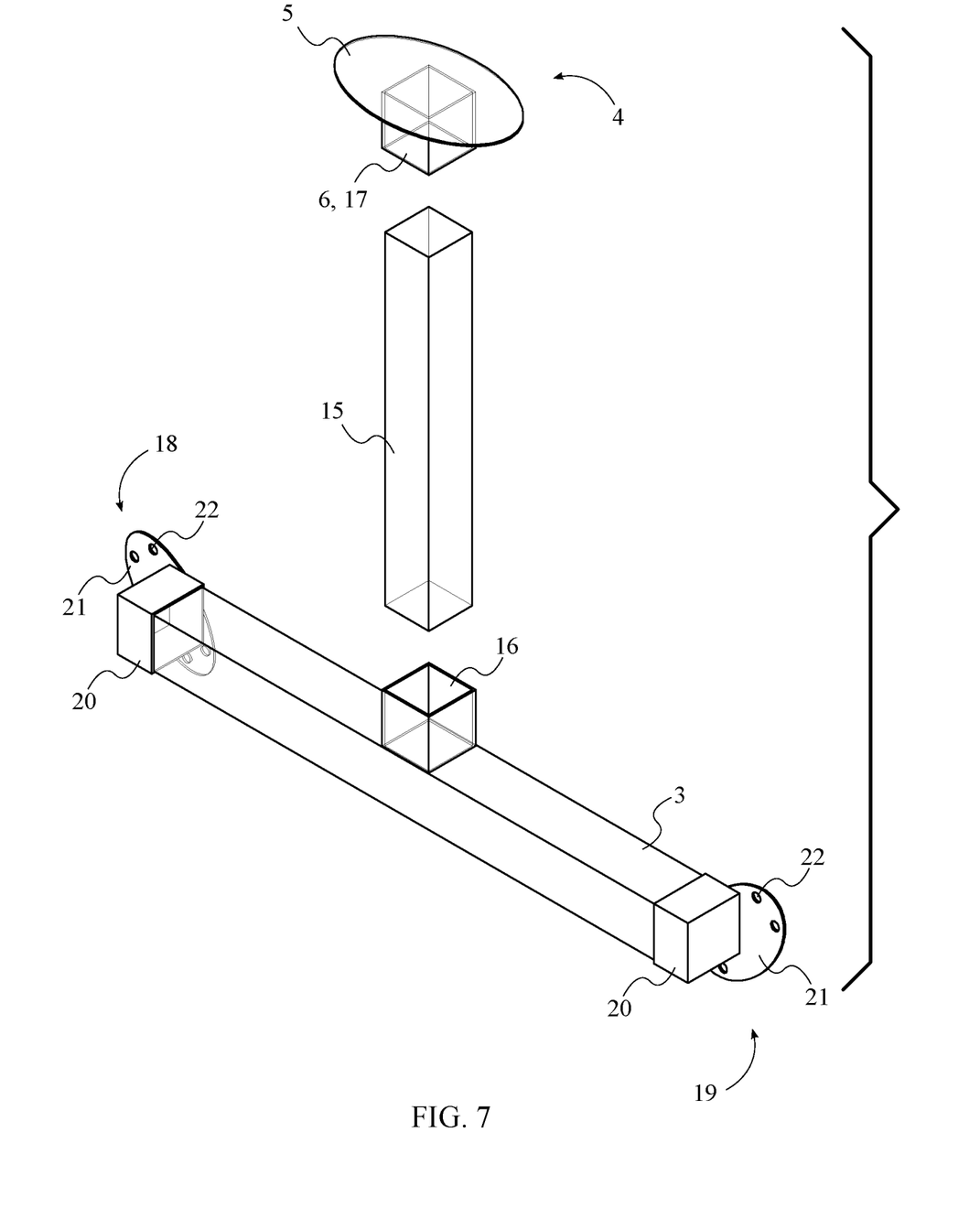
FIG. 7 is an exploded top-front perspective view showing the present invention, wherein the present invention is shown with a pedestal support.
Figure 8:
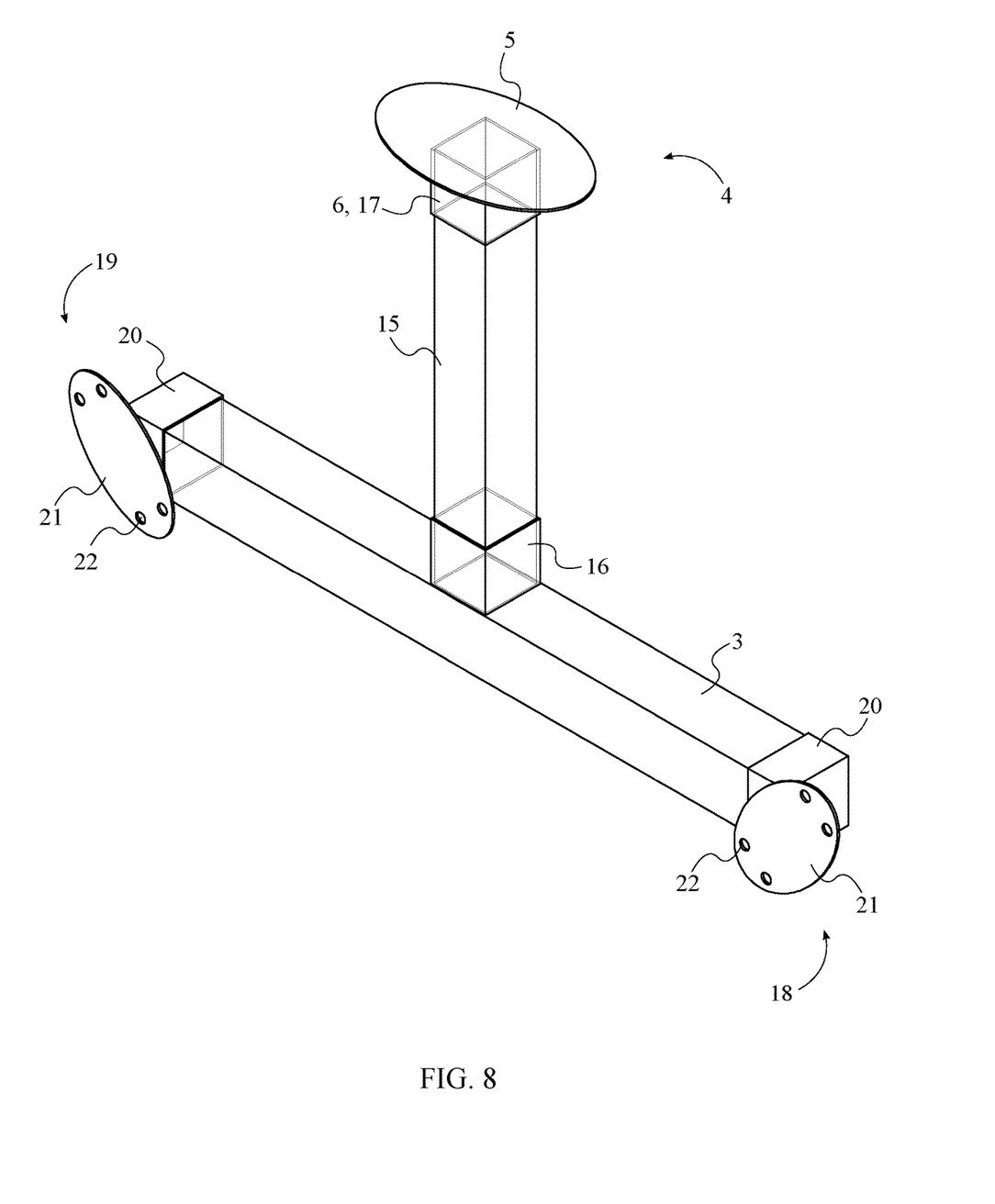
FIG. 8 is a top-rear perspective view showing the present invention, wherein the present invention is shown with the pedestal support.
Figure 9:
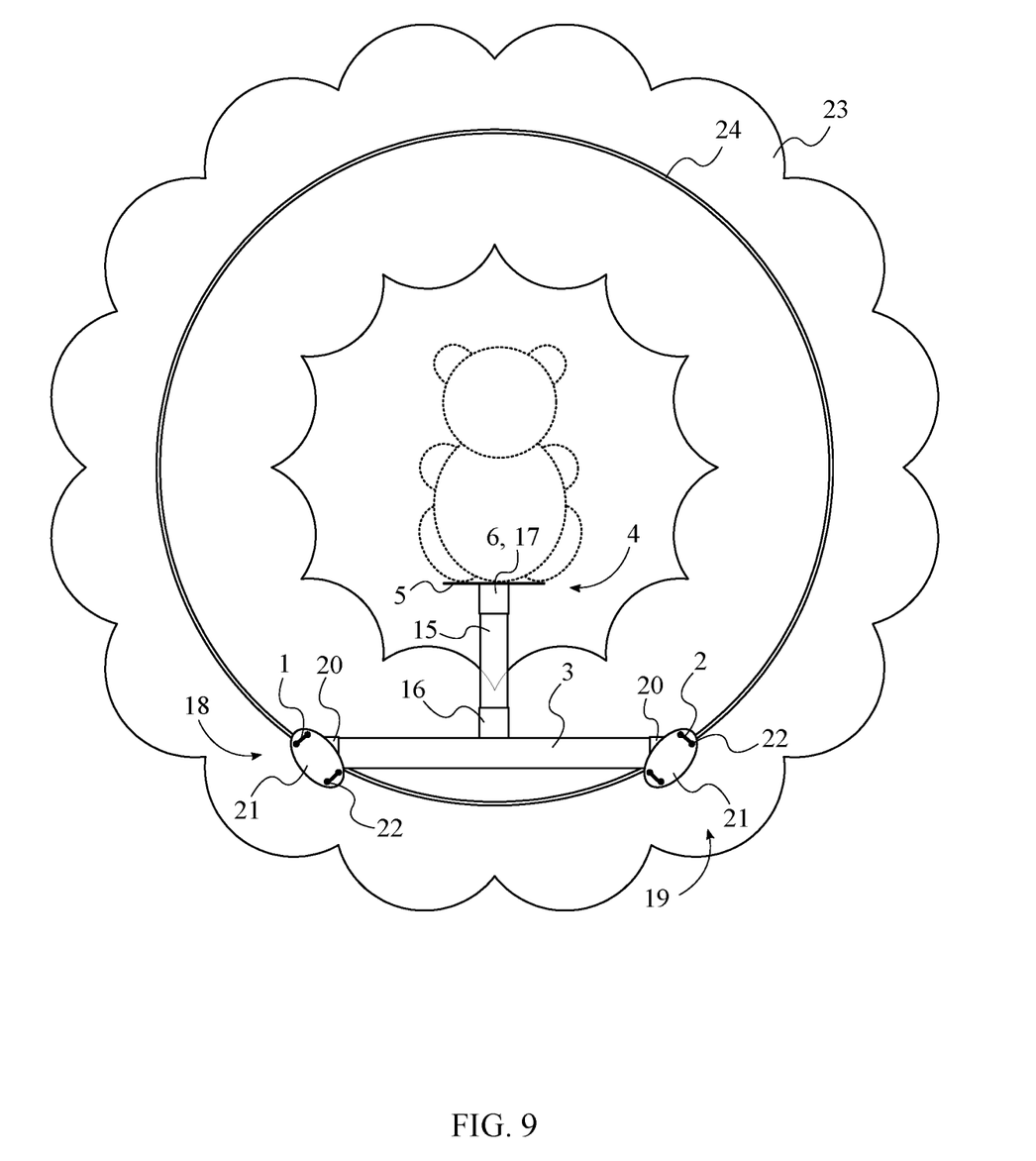
FIG. 9 is a rear view showing the present invention, wherein the present invention is shown mounted to the wire frame of the wreath, and wherein an ornament is shown mounted to the support platform attached to the pedestal support.

In another embodiment, the present invention may further comprise a pedestal support 15 that greatly offsets the desired ornament from the support beam 3 without taking too much space on the support beam 3. As can be seen in FIG. 7 through 9, the pedestal support 15 is positioned perpendicular to the support beam 3 to increase the distance between the ornament and the support beam 3. In addition, the pedestal support 15 is centrally positioned along the support beam 3 so that the ornament is centered on the wreath 23. To connect the pedestal support 15 to the support beam 3, the support beam 3 is terminally attached to the pedestal support 15. This leaves the other end of the pedestal support 15 free to receive the support platform 4. Then, to secure the support platform 4 to the pedestal support 15, the platform body 5 is terminally attached to the pedestal support 15 by the attachment mechanism 6, opposite to the support beam 3. As a result, the ornament is positioned at a distance from the support beam 3 that corresponds to the length of the pedestal support 15.

To facilitate the attachment of the pedestal support 15 to the support beam 3, the present invention may further comprise a third socket 16, as shown in FIG. 6 through 9. In addition, to facilitate the attachment of the support platform 4 to the pedestal support 15, the attachment mechanism 6 may be a fourth socket 17. The third socket 16 and the fourth socket 17 enable the desired component to be easily slid into and secured to the corresponding socket. So, the third socket 16 is laterally connected to support beam 3 to receive the pedestal support 15, while the fourth socket 17 is connected onto the platform body 5 to connect the support platform 4 to the pedestal support 15. Then, to assemble the system, the pedestal support 15 is attached into the third socket 16 and the pedestal support 15 is attached into the fourth socket 17, opposite to the third socket 16. This provides more options to the user to position ornaments further from the wire frame 24 so that the ornaments are more visible in the center of the wreath 23. Moreover, to maintain the system hidden from view behind the wreath 23, the third socket 16 may be made of a transparent material. Likewise, the pedestal support 15 may also be made of a transparent material. Thus, even if the support platform 4 and adjacent portions of the pedestal support 15 stick out in the center of the wreath 23, only the ornament will be clearly visible in the center of the wreath 23.

To facilitate the adjustment of the location of the support beam 3 on the wire frame 24, the present invention may further comprise a first fastener interface 18 and a second fastener interface 19. As can be seen in FIG. 10 through 12, the first fastener interface 18 and the second fastener interface 19 are designed to attach to the back of the wire frame 24. The first fastener interface 18 and the second fastener interface 19 also offset the support beam 3 so that when attached, the supported ornament is moved forward and centered, front to back, inside the center of the wreath 23, over the wire frame 24. The back side of the first fastener interface 18 and the second fastener interface 19 is flat so as not to hit the surface behind the wreath 23, such as a wall or a door. In addition, the first fastener interface 18 and the second fastener interface 19 allow the support beam 3 to be positioned at any orientation on the wreath 23, not just limited to placing the decoration in an upright position centered on the bottom inside-center of the wreath 23. The first fastener interface 18 and the second fastener interface 19 can be flat plates large enough to cover the width of the wire frame 24. The first fastener interface 18 is terminally connected to the support beam 3 to match with the position of the first wire fastener 1. Likewise, the second fastener interface 19 is terminally connected to the support beam 3, opposite to the first fastener interface 18, to match with the location of the second wire fastener 2. Further, the first wire fastener 1 is attached onto the first fastener interface 18, and the second wire fastener 2 is attached onto the second fastener interface 19. Thus, the first fastener interface 18 and the second fastener interface 19 secure the support beam 3 to the wire frame 24. In addition, the first fastener interface 18 and the second fastener interface 19 enable the user to position the present invention at any location and orientation along the wire frame 24, such as closer to the bottom of the wreath 23, angled, positioned upside down, etc.

Furthermore, the first fastener interface 18 and the second fastener interface 19 may each comprise a beam setting 20, an interface plate 21, and a plurality of interface holes 22 to enable additional adjustment. As can be seen in FIG. 10 through 12, the beam setting 20 is a hollow protrusion which fits on the ends of the support beam 3. The interface plate 21 keeps the beam setting 20 flushed against the wire frame 24. The plurality of interface holes 22 enables the use of the first wire fastener 1 and the second wire fastener 2 with the interface plate 21. The support beam 3 may comprise a first beam end and a second beam end. The first beam end is attached into the beam setting 20 of the first fastener interface 18 to secure the first fastener interface 18 to the support beam 3. Likewise, the second beam end is attached into the beam setting 20 of the second fastener interface 19 to secure the second fastener interface 19 to the support beam 3. The interface plate 21 is laterally connected to the beam setting 20 to position the interface plate 21 parallel to the support beam 3. Further, the plurality of interface holes 22 traverses through the interface plate 21, and the plurality of interface holes 22 is also distributed across the interface plate 21. The plurality of interface holes 22 includes multiple holes that enable the user to fasten the first fastener interface 18 in different orientations to perfectly center the etched transparent plate on the wreath 23. Further, the first wire fastener 1 is engaged through the plurality of interface holes 22 for the first fastener interface 18. Likewise, the second wire fastener 2 is engaged through the plurality of interface holes 22 of the second fastener interface 19. Thus, the user can position and level the support beam 3 as desired by weaving the first wire fastener 1 and the second wire fastener 2 through the different holes of the plurality of interface holes 22 on the first fastener interface 18 and the second fastener interface 19, respectively.

Although the invention has been explained in relation to its preferred embodiment, it is to be understood that many other possible modifications and variations can be made without departing from the spirit and scope of the invention as hereinafter claimed.

What is claimed is:

1. A wreath decoration mounting system comprising:
a first wire fastener;
a second wire fastener;
a support beam;
a support platform;
the support platform comprising a platform body and an attachment mechanism;
the first wire fastener being terminally mounted to the support beam;
the second wire fastener being terminally mounted to the support beam, opposite to the first wire fastener;
the attachment mechanism being connected onto the platform body;
the platform body being positioned parallel to the support beam; and,
the platform body being laterally mounted to the support beam by the attachment mechanism.

2. The wreath decoration mounting system as claimed in claim 1, wherein the support beam and the support platform are made of a transparent material.

3. The wreath decoration mounting system as claimed in claim 1 comprising:
the attachment mechanism comprising a first flexible jaw and a second flexible jaw;
the first flexible jaw and the second flexible jaw being mounted onto the platform body;
the first flexible jaw and the second flexible jaw being positioned offset from each other; and,
the support beam being laterally pressed in between the first flexible jaw and the second flexible jaw.

4. The wreath decoration mounting system as claimed in claim 1 comprising:
a U-shaped intermediate support;
the U-shaped intermediate support comprising a support web, a first support leg, and a second support leg;
the first support leg and the second support leg being positioned parallel and offset to each other;
the support beam being terminally attached to the first support leg and the second support leg;
the support web being terminally connected to the first support leg and the second support leg, opposite to the support beam; and,
the platform body being laterally attached to the support beam by the attachment mechanism.

5. The wreath decoration mounting system as claimed in claim 4 comprising:
the attachment mechanism comprising a first flexible jaw and a second flexible jaw;
the first flexible jaw and the second flexible jaw being mounted onto the platform body;
the first flexible jaw and the second flexible jaw being positioned offset from each other; and,
the support web being laterally pressed in between the first flexible jaw and the second flexible jaw.

6. The wreath decoration mounting system as claimed in claim 4 comprising:
a first socket;
a second socket;
the first socket and the second socket being laterally connected to the support beam;
the first socket being positioned offset to the first wire fastener;
the second socket being positioned offset to the second wire fastener;
the first socket and the second socket being positioned offset from each other;
the first support leg being attached into the first socket; and,
the second support leg being attached into the second socket.

7. The wreath decoration mounting system as claimed in claim 6, wherein the first socket and the second socket are made of a transparent material.

8. The wreath decoration mounting system as claimed in claim 4, wherein the U-shaped intermediate support is made of a transparent material.

9. The wreath decoration mounting system as claimed in claim 1 comprising:
a pedestal support;
the pedestal support being positioned perpendicular to the support beam;
the pedestal support being centrally positioned along the support beam;
the support beam being terminally attached to the pedestal support; and,
the platform body being terminally attached to the pedestal support by the attachment mechanism, opposite to the support beam.

10. The wreath decoration mounting system as claimed in claim 9 comprising:
a third socket;
the attachment mechanism being a fourth socket;
the third socket being laterally connected to support beam;
the fourth socket being connected onto the platform body;
the pedestal support being attached into the third socket; and,
the pedestal support being attached into the fourth socket, opposite to the third socket.

11. The wreath decoration mounting system as claimed in claim 10, wherein the third socket is made of a transparent material.

12. The wreath decoration mounting system as claimed in claim 9, wherein the pedestal support is made of a transparent material.

13. The wreath decoration mounting system as claimed in claim 1 comprising:
a first fastener interface;
a second fastener interface;
the first fastener interface being terminally connected to the support beam;
the second fastener interface being terminally connected to the support beam, opposite to the first fastener interface;
the first wire fastener being attached onto the first fastener interface; and,
the second wire fastener being attached onto the second fastener interface.

14. The wreath decoration mounting system as claimed in claim 13 comprising:
the first fastener interface and the second fastener interface each comprising a beam setting, an interface plate, and a plurality of interface holes;
the support beam comprising a first beam end and a second beam end;
the first beam end being attached into the beam setting of the first fastener interface;

the second beam end being attached into the beam setting of the second fastener interface;
the interface plate being laterally connected to the beam setting;
the plurality of interface holes traversing through the interface plate;
the plurality of interface holes being distributed across the interface plate;
the first wire fastener being engaged through the plurality of interface holes for the first fastener interface; and,
the second wire fastener being engaged through the plurality of interface holes of the second fastener interface.

15. A wreath decoration mounting system comprising:
a first wire fastener;
a second wire fastener;
a support beam;
a support platform;
a first fastener interface;
a second fastener interface;
the support platform comprising a platform body and an attachment mechanism;
the attachment mechanism being connected onto the platform body;
the platform body being positioned parallel to the support beam;
the platform body being laterally mounted to the support beam by the attachment mechanism;
the first fastener interface being terminally connected to the support beam;
the second fastener interface being terminally connected to the support beam, opposite to the first fastener interface;
the first wire fastener being attached onto the first fastener interface; and,
the second wire fastener being attached onto the second fastener interface.

16. The wreath decoration mounting system as claimed in claim 15, wherein the support beam and the support platform are made of a transparent material.

17. The wreath decoration mounting system as claimed in claim 15 comprising:
the attachment mechanism comprising a first flexible jaw and a second flexible jaw;
the first flexible jaw and the second flexible jaw being mounted onto the platform body;
the first flexible jaw and the second flexible jaw being positioned offset from each other; and,
the support beam being laterally pressed in between the first flexible jaw and the second flexible jaw.

18. The wreath decoration mounting system as claimed in claim 15 comprising:
a U-shaped intermediate support;
a first socket;
a second socket;
the attachment mechanism comprising a first flexible jaw and a second flexible jaw;
the U-shaped intermediate support comprising a support web, a first support leg, and a second support leg;
the first support leg and the second support leg being positioned parallel and offset to each other;
the support beam being terminally attached to the first support leg and the second support leg;
the support web being terminally connected to the first support leg and the second support leg, opposite to the support beam;
the platform body being laterally attached to the support beam by the attachment mechanism;
the first flexible jaw and the second flexible jaw being mounted onto the platform body;
the first flexible jaw and the second flexible jaw being positioned offset from each other;
the support web being laterally pressed in between the first flexible jaw and the second flexible jaw;
the first socket and the second socket being laterally connected to the support beam;
the first socket being positioned offset to the first wire fastener;
the second socket being positioned offset to the second wire fastener;
the first socket and the second socket being positioned offset from each other;
the first support leg being attached into the first socket;
the second support leg being attached into the second socket; and,
the first socket, the second socket, and the U-shaped intermediate support being made of a transparent material.

19. The wreath decoration mounting system as claimed in claim 15 comprising:
a pedestal support;
a third socket;
the attachment mechanism being a fourth socket;
the pedestal support being positioned perpendicular to the support beam;
the pedestal support being centrally positioned along the support beam;
the support beam being terminally attached to the pedestal support;
the platform body being terminally attached to the pedestal support by the attachment mechanism, opposite to the support beam;
the third socket being laterally connected to support beam;
the fourth socket being connected onto the platform body;
the pedestal support being attached into the third socket;
the pedestal support being attached into the fourth socket, opposite to the third socket; and,
the third socket and the pedestal support being made of a transparent material.

20. The wreath decoration mounting system as claimed in claim 15 comprising:
the first fastener interface and the second fastener interface each comprising a beam setting, an interface plate, and a plurality of interface holes;
the support beam comprising a first beam end and a second beam end;
the first beam end being attached into the beam setting of the first fastener interface;
the second beam end being attached into the beam setting of the second fastener interface;
the interface plate being laterally connected to the beam setting;
the plurality of interface holes traversing through the interface plate;
the plurality of interface holes being distributed across the interface plate;
the first wire fastener being engaged through the plurality of interface holes for the first fastener interface; and,
the second wire fastener being engaged through the plurality of interface holes of the second fastener interface.

* * * * *